United States Patent
Iinuma (10) Patent No.: US 7,328,990 B2
(45) Date of Patent: Feb. 12, 2008

(54) INK-JET INK SET, INK-JET RECORDING METHOD, AND INK-JET RECORDING APPARATUS

(75) Inventor: Taiga Iinuma, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 337 days.

(21) Appl. No.: 10/934,564

(22) Filed: Sep. 7, 2004

(65) Prior Publication Data

US 2005/0157131 A1    Jul. 21, 2005

(30) Foreign Application Priority Data

Jan. 20, 2004   (JP)  ............................ 2004-011525

(51) Int. Cl.
*G01D 11/00*    (2006.01)

(52) U.S. Cl. .................... 347/100; 347/95; 347/101; 106/31.13

(58) Field of Classification Search .............. 347/100, 347/95, 96, 101; 106/31.6, 31.13, 31.27; 523/160
See application file for complete search history.

(56) References Cited

U.S. PATENT DOCUMENTS

| 6,173,647 B1 | 1/2001 | Kakuta et al. ............... 347/105 |
| 2002/0083866 A1* | 7/2002 | Arita et al. ............... 106/31.27 |
| 2003/0103121 A1* | 6/2003 | Tomioka et al. ............ 347/100 |

FOREIGN PATENT DOCUMENTS

| JP | A 2001-199150 | 7/2001 |
| JP | A 2002-79740 | 3/2002 |

* cited by examiner

*Primary Examiner*—Manish S. Shah
(74) *Attorney, Agent, or Firm*—Oliff & Berridge, PLC (57) ABSTRACT

The present invention provides an ink-jet ink set including an ink-jet ink containing a colorant and a surfactant, and a treatment liquid, wherein an ink droplet formed by bringing the ink-jet ink into contact with the treatment liquid has a ratio (H/R) of height (H) to contact-area diameter (R) of from 0.15 to 0.30, the ratio (H/R) is detected at a point 100 milliseconds (ms) after ejecting the ink droplet onto a plain paper. The present invention also provides an ink-jet recording method and ink-jet recording apparatus using the ink-jet ink set.

26 Claims, 2 Drawing Sheets

INK-JET INK SET, INK-JET RECORDING METHOD, AND INK-JET RECORDING APPARATUS

CROSS-REFERENCE TO RELATED APPLICATION

This application claims priority under 35USC 119 from Japanese Patent Application No. 2004-11525, the disclosure of which is incorporated by reference herein.

BACKGROUND OF THE INVENTION

1. Field of the Invention

The present invention relates to an ink-jet ink set, an ink-jet recording method, and an ink-jet recording apparatus.

2. Description of the Related Art

Recording apparatuses employing a so-called ink-jet process, which eject a liquid ink or molten solid ink from a nozzle, slit, porous film, or the like and thereby record images on paper, cloth, film, and the like, have various advantages, such as compactness, lower price, lower noise, and the like. In addition to monochrome printers using black ink which provide favorable printing quality on so-called plain papers including writing paper, copying paper, and the like, recently products that allow full color printing has become commercially available in large numbers, which products have come to occupy a major position in the recording apparatus field. Among these, a so-called piezo ink-jet process that uses a piezoelectric device, and a so-called thermal ink-jet process that uses thermal energy to form ink droplets and thereby record images, have many advantages, including high-speed printing, high-resolution images, and the like.

Inks used in ink-jet recording apparatuses consist mainly of a solvent, a colorant, and an additive. The following properties, among others, are required of the inks: (1) High-resolution, high-density and uniform images are provided without bleeding an ink on a paper; (2) the ink dries quickly on the paper; (3) the images provided have good fastness; and (4) the images provided have good long-term storage stability. In addition, in the case of high-speed high-image-quality ink jet printers for offices that have been placed on the market in recent years, an double side printing capacity is emphasized. An important requirement for these ink-jet printers is to reduce or inhibit the curl and cockle of recording media, which phenomena often occur when plain paper is used.

A possible method for increasing the density of images recorded is to block a process whereby a colorant penetrate into a paper and to cause the colorant to remain on a surface of the paper. For this purpose, in addition to methods of increasing the concentration of colorant in an ink and of increasing the diameter of dispersed colorant particles, a method of using an anion-cation reaction is disclosed in Japanese Patent Application Laid-Open (JP-A) No. 2002-79740, and a method of using a coagulation reaction caused by differences in pH between inks is disclosed in JP-A No. 2001-199150. These methods are very effective methods that also have curative properties against feathering and ICB.

In these methods employing a reactive processing solution, high-density images are provided by using an ink and a reactive treatment liquid having a coagulative action, and by coagulating a colorant by bringing the solution into contact with the ink on a paper. However, simultaneous use of an ink and a reactive treatment liquid for printing increases the total amount of liquid ejected onto the paper, causing curl and cockle of the printed paper. Deformation of a recording medium caused by curl and cockle leads to a decrease in image quality due to dislocation of the point of spotting of an ink droplet on the paper and jamming of the paper as it is fed through the printer. In addition, papers thus deformed often come into contact with the print head and damage the nozzle face. The reaction between the two liquids, moreover, which inhibit the penetration and spreading of the ink, decreases the diameter of an ink dot, thereby providing inferior image definition. To counter this phenomenon, it is necessary to print with a high density of ink, which result in an increased quantity the ink ejected, often causing higher incidence of problems such as curl and cockle of recording media and the ink having an inferior drying property due to the increase in the amount of liquid ejected.

A possible method for improving the drying property of an ink is to increase penetration of the ink into paper. This method involves preparing a quick drying by decreasing the surface tension of the ink by adding a penetrant or a surfactant thereto, thereby increasing the permeability of the ink into paper. However, inks with high permeability have the undesirable effect of allowing penetration of colorants into paper, which has disadvantageous result of reducing image density.

To solve the above problems, the following properties are required: (1) Ink droplets spread smoothly after spotting on a paper and provide well defined images; and (2) high-density images are formed even when the total amount of both the ink and the reactive treatment liquid ejected is reduced. If these requirements are satisfied, high density images can be provided while also inhibiting curl and cockle of recording media. Reduction in the amount of the ink and the reactive treatment liquid ejected has many advantages, such as reduced running costs, prolonged life of printer heads, and reduced work load of a maintenance unit and, having a significant positive effect on the performance of an entire system. However, there is currently no technology available that satisfies these requirements.

SUMMARY OF THE INVENTION

After intensive studies, the present inventors have found that it is possible to solve the above problems associated with two-liquid reaction-type printing systems by regulating within a particular range the ratio (H/R) of the height (H) and the diameter of the contact area (R) of an ink droplet on the recording medium at a predetermined time after an ink droplet is spotted on the recording medium, and have devised the ink-jet ink set, ink-jet recording method, and ink-jet recording apparatus according to the invention.

One aspect of the invention is to provide an ink-jet ink set including an ink-jet ink containing a colorant and a surfactant; and a treatment liquid, wherein an ink droplet formed by bringing the ink-jet ink into contact with the treatment liquid has a ratio (H/R) of height (H) to contact-area diameter (R) of from 0.15 to 0.30, the ratio(H/R) is detected at a point 100 milliseconds (ms) after ejecting the ink droplet onto a plain paper.

Another aspect of the invention is to provide an ink-jet recording method using an ink-jet ink containing a colorant and a surfactant, and a treatment liquid, comprising forming images by bringing the ink-jet ink into contact with the treatment liquid on to a recording medium, wherein an ink droplet formed by bringing the ink-jet ink into contact with the treatment liquid has a ratio (H/R) of height (H) to contact-area diameter (R) of from 0.15 to 0.30, the ratio (H/R) is detected at a point 100 milliseconds (ms) after ejecting the ink droplet onto a plain paper.

A further aspect of the invention is to provide an ink-jet recording apparatus using an ink-jet ink set containing an ink-jet ink and a treatment liquid, wherein an ink droplet formed by bringing the ink-jet ink into contact with the treatment liquid has a ratio (H/R) of height (H) to contact-area diameter (R) of from 0.15 to 0.30, the ratio (H/R) is detected at a point 100 milliseconds (ms) after ejecting the ink droplet onto a plain paper.

The invention provides an ink-jet ink set that ejects ink droplets with superior drying property and forms high-density images with a smaller amount of ink ejected, without curl and cockle of recording media, as well as an image recording method and an ink-jet recording apparatus using the ink set.

DETAILED DESCRIPTION OF THE INVENTION

I. Ink-jet Ink Set

An embodiment of the ink-jet ink set according to the present invention will be described hereinafter.

The ink-jet ink set according to the invention comprises an ink-jet ink containing a colorant and a surfactant, and a treatment liquid, wherein when an ink droplet formed by bringing the ink-jet ink into contact with the treatment liquid is ejected onto plain paper, a ratio (H/R) of height (H) to contact-area diameter (R) of the ink droplet on the plain paper at a point 100 milliseconds (ms) after ejection is in a range of 0.15 to 0.30.

In this specification, the diameter of the contact area of the ink droplet (R) and the height of the ink droplet (H) are values determined by using a dynamic contact angle-measuring device (brand name: FIBRO 1100 DAT MKII, manufactured by FIBRO System AB).

The ink-jet ink set according to the invention having the configuration above exhibits the advantageous effects that: (1) the ink droplets spotted spread smoothly and provide uniform images; and (2) high-density images are formed even when the total amount of the ink and the reactive treatment liquid ejected is reduced. Thus images higher in density can be formed while inhibiting curl and cockle of recording media. The advantageous effects also include reduction in running cost caused by reductions in the amount of the ink and the reactive treatment liquid ejected, prolonged life of printer heads, reduction in the work load of a maintenance unit, and others.

In the invention, when an ink droplet formed by bringing the ink-jet ink into contact with the treatment liquid is ejected onto plain paper, the ratio (H/R) of height (H) to contact-area diameter (R) of ink droplet on the plain paper at a point 100 milliseconds (ms) after ejection should be in a range of 0.15 to 0.30.

Hitherto, the permeability and wettability of an ink has been evaluated by the dynamic contact angle between a recording medium (paper) and the end of an ink droplet spotted thereon. However, it has been found that for evaluation of the spread of ink, the ratio (H/R) of the height (H) to the diameter of the contact area (R) of an ink droplet on a recording medium (hereinafter, referred to as the "H/R ratio") describes the properties of the ink more accurately. The invention is based on this finding.

The reason for defining the diameter of the ink droplet ejected onto the recording medium at the point 100 milliseconds (ms) after ejection is as follows: The ink droplet ejected from an ink-jet recording head and spotted on the recording medium first spreads horizontally on the recording medium after which it then penetrates into the recording medium. The process of the ink spreading horizontally takes about 100 milliseconds, which process is then superseded by the penetration process. Accordingly, the H/R ratio after 100 milliseconds best represents the properties of the ink.

The H/R ratio in the invention is a value determined by using a plain paper as the recording medium, but applications of the ink set according to the invention are not necessarily limited to plain papers and include other recording media as well. Applicable recording media are described below. In this invention, plain paper donates P Paper (manufactured by Fuji Xerox Office Supply Co., Ltd.).

When ejected from an ink jet recording head and spotted on a recording medium surface, an ink having an H/R ratio in the range of 0.15 to 0.30 spreads swiftly, resulting in a dot larger in diameter, and in an ink droplet of reduced thickness and larger contact area remaining on the recording medium. Therefore, even with a smaller ejection amount the ink can provide images having sufficient density and coverage, can prevent incidences of curl and cockle and can preserve its drying property. In particular, an ink having a dynamic contact angle of 20° or more and less than 50° at the point 100 milliseconds after ejection is superior both in image density and drying property.

In addition, the smaller the total amount of the ink-jet ink and the treatment liquid ejected, the more effective the prevention of curl and cockle. The amount of the treatment liquid ejected is preferably 5% to 30%, and more preferably 5% to 15% with respect to the ink quantity ejected. In addition, the total amount of the ink and the reactive treatment liquid ejected is preferably 0.2 to 1.5 mg/cm$^2$, and more preferably 0.3 to 1.0 mg/cm$^2$.

According to the invention, images can be formed with a smaller amount of ink, allowing reduction in the amount of treatment liquid used and thus drastic reduction in the total amount of ink and treatment liquid ejected onto a recording medium, when compared to the amount needed in conventional two-liquid reaction-type printing systems. This reduction in ejection amount has various advantages such as reduction in running cost, prolonged life of printer heads, reduction in the work load of a maintenance unit, and others, enabling a significant improvement in the performance of an entire system.

In contrast, an ink droplet having an H/R ratio of 0.30 or more, when spotted on a recording medium, retains an hemispherical shape and does not spread smoothly on the recording medium, leading to an increase in the quantity of ink penetration per unit area and slowing the drying speed. In addition, each dot formed is smaller in size, and resulting the wider gap between dots causes a decrease in coverage and thus also visible image density.

On the contrary, an ink having an H/R ratio of less than 0.15 is an extremely penetrable ink. With extremely rapid penetration, pigment in the ink are in contact with the reactive treatment liquid only for a short period, and because coagulation is thus insufficient, the ink penetrates into the recording medium resulting in reduced image density.

There are many methods for controlling the value of the H/R ratio, including: control the kind and amount of the surfactant contained in an ink-jet ink; regulating the content of the water-soluble organic solvent; adding a penetrative solvent such as carbitol acid or diol acid; and regulating the particle diameter and the surface treatment condition of the colorant. Among these, method of control by adjusting the kind and amount of the surfactant contained in the ink-jet ink is preferred. This is because to obtain a desired H/R value it is necessary for the ink to be able to spread rapidly when it is ejected onto a paper, and the addition of a surfactant is the most effective method of satisfying this requirement.

(Ink-Jet Ink)

Hereinafter, an ink-jet ink (hereinafter, also referred to as "ink"), which is a constituent of the ink set according to the invention, is described. The ink-jet ink according to the invention contains a colorant and a surfactant, and may also contain other components as needed.

—Surfactants—

Surfactants according to the invention are described in detail below.

Generally, surfactants are classified according to their structures as straight-chain surfactants and branched-chain surfactants. A straight-chain surfactant means a surfactant having a straight-chain hydrophobic group in the surfactant molecule. Examples thereof include surfactants having a straight-chain alkyl chain as the hydrophobic group, such as sodium straight-chain alkylbenzenesulfate, which is commonly used in household detergents. Straight-chain surfactants are advantageous when designing an ink with low surface tension and high image density, as they have a high emulsifying and a low penetrative potential. Atomic groups having aromatic ring structures broadly classified as straight-chain structure rather than as branched structures, but those having two or more hydrophobic chains connected to an aromatic ring are grouped as branched structures.

On the other hand, a branched-chain surfactant means a surfactant having a branched hydrophobic group in the surfactant molecule. Examples thereof include surfactants having a hydrophobic group wherein a methyl, ethyl, or other group is connected as a branched structure to the alkyl main chain. Surfactants having a hydrophilic group connected to the main chain of a straight chain structure other than at the terminal position thereof are also classified as having a branched structure.

These branched-chain surfactants, having high penetrating potential and low emulsifying potential, are often used in quick drying inks. Specific examples thereof include surfactants represented by the Surfynol products manufactured by Nisshin Chemicals Co., Ltd.

When the orientation speeds of surfactants on an ink droplet surface are compared, branched-chain surfactants have faster orientation than straight-chain surfactants. Accordingly, it can be presumed that the properties of a branched-chain surfactant are superior with respect to the surface condition of an ink droplet immediately after it is ejected from a nozzle of an ink-jet head and spotted on a recording medium, in that they enable increased expansion of dot diameter. In addition, it can be presumed that the properties of a straight-chain surfactant, which orients on the surface of an ink more slowly at a point of 10 milliseconds after spotting, are superior when the droplet enters the penetration phase at a point of approximately 100 milliseconds, in that they inhibit the penetration of the colorant and enable achievement of high image density.

Straight-chain surfactants have slow orientation speed and low ability to penetrate colorants into a recording medium, and are thus effective when designing inks having high image density. However, when only a straight-chain surfactant is used, although the contact-area diameter (R) of an ink droplet may increased, the height (H) of the ink droplet is resistant to reduction, resulting in the ink droplet having an H/R ratio greater than 0.3. Combined use of a branched-chain and straight-chain surfactant provides an effective solution to this problem. The branched-chain surfactant functions to decrease the height (H) of an ink droplet on a paper. This is because branched chain surfactants have faster orientation at the interface than straight-chain surfactants and rapidly orient themselves on the ink droplet surface after ink ejection, from which it can be presumed that they decrease surface tension of the droplet immediately after contact with a recording medium, and accelerate initial spreading thereof.

If only a branched-chain surfactant is used, penetrating potential increases, which often results in an ink having an H/R ratio of less than 0.15. While exhibiting extremely favorable permeability, such inks are often not practical because, as described above, image density is significantly reduced.

Accordingly, the surfactant according to the invention is either preferably a single straight-chain surfactant or a mixture of straight-chain and branched-chain surfactants, and more preferably a mixture of straight-chain and branched-chain surfactants.

As described above, combined use of a straight-chain surfactant and a branched-chain surfactant is preferable for the surfactant used in the ink-jet recording ink according to the invention.

The surfactant according to the invention may be any one of a nonionic, anionic, cationic, and amphoteric surfactant, but in order to prevent an ionic interaction with the hydrophilic functional groups contained in the colorant such as a self-dispersible pigment or the like, the surfactant is preferably an ionic surfactant having an ionic group in the same polarity or a nonionic surfactant.

Examples of nonionic branched-chain surfactants include acetylene glycol derivatives (e.g., Surfynol series products, manufactured by Nisshin Chemicals Co., Ltd.), polyoxyethylene branched-alkylethers (e.g., BLAUNON EH series products, manufactured by Aoki Oil Industrial), and the like.

Examples of anionic branched-chain surfactants include dialkylsulfosuccinates (e.g., Aerosol series products, manufactured by Mitsui Scitex), and the like.

Examples of cationic branched-chain surfactants include quaternary ammonium salts such as lauryltrimethylammonium chloride and distearyldimethylammonium chloride; N-branched alkyl-substituted pyridinium salts; and the like.

Examples of amphoteric branched-chain surfactants include betaine surfactants such as dimethylalkylbetaines, amino acid-derived surfactants, and the like.

Examples of nonionic straight-chain surfactants include polyoxyethylene straight-chain alkylethers such as polyoxyethylene octylether, polyoxyethylene cetylether, and polyoxyethylene laurylether; polyoxyethylene straight-chain alkylphenylethers such as polyoxyethylene nonylphenylether, polyoxyethylene octylphenylether, and polyoxyethylene dodecylphenylether; and the like.

Examples of anionic straight-chain surfactants include alkylaromatic surfactants such as alkylbenzenesulfates and alkylnaphthalenesulfates, and the like.

Examples of cationic straight-chain surfactants include N-straight-chain alkyl-substituted pyridinium salts such as dodecylpyridinium chloride and tetradecylpyridinium chloride; and the like.

Among surfactants above, the straight-chain surfactants used in the invention are preferably alkylaromatic surfactants such as alkylbenzenesulfates and alkylnaphthalenesulfates, and more preferably alkylnaphthalenesulfates.

The alkyl group in the alkylaromatic surfactants is preferably an alkyl group having 3 to 6 carbon atoms. Such a surfactant provides a more favorable inks.

Generally, alkylaromatic surfactants have an alkyl group having a longer chain of 10 or more carbon atoms. Due to the effect of the longer alkyl chain such surfactants have a lower penetrating potential and thus provide high image density. However, straight-chain surfactants are slower in orientation (migration) compared to branched-chain surfactants and thus need to be added in a greater amount. Consequently, it becomes more difficult to achieve balance between viscosity and ejectablity.

Accordingly, in order to design ink compositions that are less limited it is more favorable to use an alkylaromatic surfactant having a shorter alkyl chain of 3 to 6 carbon. These alkylaromatic surfactants are considered to have faster orientation (migration) because the alkyl chain is shorter, and thus significantly more effective in suppressing penetration of a colorant that is facilitated by a branched-chain surfactant. In addition, as the alkyl chain is shorter, these surfactants are considered to also function as aromatic electrolytes. Thus, these surfactants are considered facilitate coagulation of colorant particles on the surface of a recording medium and to increase image density. Further, the coagulation of the colorant on the recording medium surface inhibit both penetration of an ink and curl and cockle of the recording medium.

When an alkylnaphthalenesulfate having an alkyl group having 3 to 6 carbon atoms is used as the straight-chain surfactant, the branched-chain surfactant is preferably a nonionic surfactant. Preferred examples thereof include nonionic surfactants such as acetylene glycol-based surfactants and 2-ethylhexane ethylene oxide adducts.

The amount of a straight-chain surfactant added to an ink-jet ink according to the invention is preferably 0.05 to 2.5% by mass, and the amount of the branched-chain surfactant, 0.01 to 2.0% by mass, with respect to the total solids content of the ink-jet ink, and the amount of the straight-chain surfactant is more preferably 0.1 to 1.5% by mass, and the amount of the branched-chain surfactant, more preferably 0.05 to 1.0% by mass.

In addition, the amount of the straight-chain surfactant added is preferably greater than the amount of the branched-chain surfactant added. The ratio of the amounts of straight-chain to branched-chain surfactants is preferably 1.2:1 to 20:1, and more preferably 1.5:1 to 7:1.

—Colorants—

Colorants according to the invention include dyes and pigments, but are particularly preferably pigments.

These colorants have a hydrophilic functional group, and the hydrophilic functional group thereof may either a nonionic, anionic, or cationic hydrophilic functional group. The hydrophilic functional group in the colorants is particularly preferably a group or a combination of two or more groups selected from a carboxyl group, a hydroxyl group, a sulfonic acid group, and a phosphoric acid group, and still more preferably a carboxyl group or a group containing two or more groups including a carboxyl group.

The pigment used in the invention may be an inorganic or organic pigment. Suitable black pigments include carbon black pigments such as furnace black, lamp black, acetylene black, channel black, and the like. In addition to black pigments and the three primary-color pigments in cyan, magenta, and yellow, particular pigments in red, green, blue, brown, white, and the like; metallic glossy pigments in gold, silver, and the like; colorless or pale colored extender pigments; and plastic pigments and the like may also be used. Alternatively, pigments newly prepared for the invention may be used.

Typical examples of pigments used in the invention are listed below. Examples of black pigments include, but are not limited to, Raven 7000, Raven 5750, Raven 5250, Raven 5000 ULTRA II, Raven 3500, Raven 2500 ULTRA, Raven 2000, Raven 1500, Raven 1255, Raven 1250, Raven 1200, Raven 1190 ULTRA II, Raven 1170, Raven 1080 ULTRA, Raven 1060 ULTRA, Raven 790 ULTRA, Raven 780 ULTRA, and Raven 760 ULTRA (heretofore, manufactured by Columbian Carbon); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (heretofore, manufactured by Cabot); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (heretofore, manufactured by Degussa); No.25, No. 33, No.40, No.47, No. 52, No. 900, No. 2300, MCF-88, MA600, MA7, MA8, and MA100 (heretofore, manufactured by Mitsubishi Chemical Co., Ltd.); and the like. In addition, a magnetic fine particle such as magnetite or ferrite, titan black, or the like may also be used as the black pigment.

Examples of cyan pigments include, but are not limited to, C.I. Pigment Blue 1, C.I. Pigment Blue 2, C.I. Pigment Blue 3, C.I. Pigment Blue 15, C.I. Pigment Blue 15: 1, C.I. Pigment Blue 15:3, C.I. Pigment Blue 15:34, C.I. Pigment Blue 16, C.I. Pigment Blue 22, C.I. Pigment Blue 60, and the like.

Examples of magenta pigments include, but are not limited to, C.I. Pigment Red 5, C.I. Pigment Red 7, C.I. Pigment Red 12, C.I. Pigment Red 48, C.I. Pigment Red 48: 1, C.I. Pigment Red 57, C.I. Pigment Red 112, C.I. Pigment Red 122, C.I. Pigment Red 123, C.I. Pigment Red 146, C.I. Pigment Red 168, C.I. Pigment Red 184, C.I. Pigment Red 202, and the like.

Examples of yellow pigments include, but are not limited to, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 128, C.I. Pigment Yellow 129, C.I. Pigment Yellow-15 1, C.I. Pigment Yellow 154, and the like.

When a pigment is used as the colorant according to the invention, a pigment dispersant is preferably used in conjunction therewith. Pigment dispersants that can be used include polymer dispersants, anionic surfactants, cationic surfactants, amphoteric surfactants, nonionic surfactants, and the like.

Polymers having both a hydrophilic structural portion and a hydrophobic structural portion are favorably used as a polymer dispersant. The polymers having both a hydrophilic structural portion and a hydrophobic structural portion include condensation polymers and addition polymers. The condensation polymers include known polyester dispersants. The addition polymers include addition polymers composed of monomers containing an α,β-ethylenic unsaturated group. Desirable polymer dispersants are prepared by copolymerizing a suitable combination of monomers having a hydrophilic group and an α,β-ethylenic unsaturated group and monomers having a hydrophobic group and an α,β-ethylenic unsaturated group. Alternatively, homopolymers composed of monomers having a hydrophilic group and an α,β-ethylenic unsaturated group may also be used.

Examples of the monomers having a hydrophilic group and an α,β-ethylenic unsaturated group include monomers having a carboxyl group, sulfonic acid group, hydroxyl group, phosphoric acid group, or other group, including acrylic acid, methacrylic acid, crotonic acid, itaconic acid, itaconic acid monoesters, maleic acid, maleic monoesters, fumaric acid, fumaric acid monoesters, vinylsulfonic acid, styrenesulfonic acid, sulfonated vinylnaphthalenes, vinyl alcohol, acrylamide, methacryloxyethyl phosphate, bis-methacryloxyethyl phosphate, methacryloxyethylphenylazide phosphate, ethylene glycol dimethacrylate, diethylene glycol dimethacrylate, and the like.

Examples of the monomers having a hydrophobic group and an α,β-ethylenic unsaturated group include styrene derivatives such as styrene, α-methylstyrene, and vinyltoluene, vinylcyclohexane, vinylnaphthalene, vinylnaphthalene derivatives, acrylic alkylesters, methacrylic alkylesters, methacrylic phenylesters, methacrylic cycloalkylesters, crotonic alkylesters, itaconic dialkylesters, maleic dialkylesters, and the like.

Preferable examples of the copolymers used as the polymer dispersant include styrene-styrenesulfonic acid copolymers, styrene-maleic acid copolymers, styrene-methacrylic acid copolymers, styrene-acrylic acid copolymers, vinylnaphthalene-maleic acid copolymers, vinylnaphthalene-methacrylic acid copolymers, vinylnaphthalene-acrylic acid copolymers, acrylic alkylester-acrylic acid copolymers, methacrylic alkylester-methacrylic acid copolymers, styrene-methacrylic alkylester-methacrylic acid copolymers, styrene-acrylic alkylester-acrylic acid copolymers, styrene-phenyl methacrylate ester-methacrylic acid copolymers, styrene-cyclohexyl methacrylate ester-methacrylic acid copolymers, and the like. Further, a monomer having a polyoxyethylene group or a hydroxyl group may also be suitably copolymerized with these polymers.

The weight-average molecular weight of the polymer dispersant is preferably 2,000 to 50,000 from the viewpoints of the dispersibility of pigments and ink ejection property, more preferably 3,000 to 20,000, and still more preferably 4,000 to 8,000.

These pigment dispersants may be used alone or in combination of two or more. The total amount of the pigment dispersants added varies greatly according to the kind of pigment used, but is generally 0.1 to 100% by mass, preferably 1 to 70% by mass, and more preferably 3 to 50% by mass with respect to the pigment.

A self-dispersible pigment may be used as the pigment according to the invention. Here, the self-dispersible pigments are pigments having numerous water-solubilizing groups on the pigment surface that are stably dispersible in water even in the absence of a polymer dispersant. Specific examples thereof include, but are not limited to, commercially available self-dispersible pigments such as Cab-o-jet 200, Cab-o-jet 300, IJX-253, IJX-266, IJX-273, and IJX-444, and IJX-55, manufactured by Cabot; Microjet Black CW-1 and CW-2, manufactured by Orient Chemical Industries, Ltd.; and the like.

A so-called encapsulated pigment, of which the particles are coated with a polymer, may be used as the pigment according to the invention.

The content of the pigment according to the invention is preferably in the range of 0.1 to 20% by mass, more preferably in the range of 1 to 10% by mass, and particularly preferably in the range of 1 to 7% by mass with respect to the total amount of the ink-jet recording ink. An ink having a pigment content of more than 20% by mass may cause clogging at the tip of nozzles when the water therein has evaporated. In contrast, an ink having a pigment content of less than 0.1 occasionally provides images of insufficient density.

These pigments are preferably purified before use, by removing organic and inorganic impurities with which they are contaminated during production, including impurities such as remaining oxidants and the like. In particular, calcium, iron, or silicon in the ink is preferably controlled to an amount of 10 ppm or less, preferably 5 ppm or less. The content of these inorganic impurities can be determined, for example, by inductively coupled-plasma emission spectrometry. In addition, these impurities may be removed, for example, using either a single step or combined steps selected from the methods of rinsing with water, filtration through a reverse osmosis membrane or ultrafiltration membrane, and an ion-exchange method, and adsorbing with activated carbon, zeolite, or the like.

—Water-soluble Organic Solvents—

Examples of water-soluble organic solvents used for the ink-jet recording ink according to the invention include, but are not limited to, polyvalent alcohols such as ethylene glycol, diethylene glycol, propylene glycol, dipropylene glycol, butylene glycol, triethylene glycol, 1,5-pentanediol, 1,2,6-hexanetriol, trimethylolpropane, glycerin, and polyethylene glycol; lower alcohols such as ethanol, isopropyl alcohol, and 1-propanol; nitrogen-containing solvents such as pyrrolidone, N-methyl-2-pyrrolidone, cyclohexylpyrrolidone, and triethanolamine; glycol esters such as diethylene glycol monobutylether, propylene glycol monomethylether, and triethylene glycol monobutylether; sulfur-containing solvents such as thiodiethanol, thiodiglycerol, sulfolane, and dimethylsufoxide; carbonates such as propylene carbonate, ethylene carbonate, sugars such as glucose, fructose, galactose, mannose, and xylose and the derivatives thereof; sugar alcohols, and the like.

These water-soluble organic solvents may be used alone or in combination of two or more. The content of the water-soluble organic solvent is preferably 1 to 60% by mass and more preferably 5 to 40% by mass with respect to the amount of an ink-jet recording ink.

Particularly with respect to prevention of contamination with impurities, the water used in the ink-jet recording ink according to the invention is preferably ion-exchange water, ultrapure water, distilled water, or ultrafiltrated water.

The surface tension of the ink-jet ink according to the invention is preferably in the range of 18 to 33 mN/m, and the viscosity thereof is preferably in the range of 1.8 to 4.5 mPa·s. The surface tension is more preferably in the range of 23 to 28 mN/m, and the viscosity thereof in the range of 2.3 to 3.2 mPa·s.

The surface tension in the present specifiction is a value determined by using a Wilhelmy surface tension balance (manufactured by Kyowa Interface Science) under an environment of 23° C. and 55% RH.

The viscosity is a value determined by using the Rheomat 115 (manufactured by Contraves) as the measuring device under a condition of a measuring temperature of 23° C. and a shear rate of 1,400 s$^{-1}$.

(Treatment Liquid)

The treatment liquid according to the invention contains water, a water-soluble organic solvent, and a surfactant as the basic components, and additionally a pH adjusting agent, polyvalent metal cation, ammonium ion or organic ammonium ion, or the like, and facilitates coagulation of colorants when brought into contact with the ink as described above.

An example of a method of facilitating colorant coagulation according to the invention is to establish a difference between the pH of an ink and the pH of a treatment liquid and to thus facilitate coagulation of the colorants by decreasing the dispersibility of the colorants when the ink is brought into contact with the treatment liquid. In the invention, the difference in pH between the ink and the treatment liquid is particularly preferably 3.0 or more in absolute value. Further, if the colorant solution turns from acidic to alkaline or from alkaline to acidic by the contact, the coagulat action becomes greater.

A pH-adjusting agent may be used for the pH adjustment. The pH adjusting agent is selected so that the difference in pH between the ink and the treatment liquid becomes 3.0 or more in absolute value, and may be selected from a wide range of agents including known pH adjusting agents, known electrolytes, polymers, and the like.

Another method of facilitating colorant coagulation is to add at least one kind of ion selected from the group including of metal cations, ammonium ion, and organic ammonium ions to the treatment liquid and to thus facilitate coagulation of the colorants by decreasing the dispersibility of the colorants when the ink is brought into contact with the treatment liquid.

Among the above ions, polyvalent metal cations are effective materials as they migrate rapidly when the ink is brought into contact with the treatment liquid. The effective polyvalent metal cations include ions of the elements in groups 2, 3, 12, and 13 in the periodic table, and among them, bivalent or higher-valent ions such as magnesium, calcium, aluminum, and other ions are especially effective as they cross-link the ionic functional groups in multiple colorants and lead to three-dimensional cross-linking and coagulation.

These polyvalent metal cations may be obtained by adding common water-soluble salts to the treatment liquid.

Surfactants used in the treatment liquid include polyoxyethylene alkylether surfactants, alkynediol ethylene oxide adducts, polyoxyethylene alkylphenylether surfactants, polyallylamine, pyridinium salts, betaines, and the like.

Particularly with respect to prevention of contamination with impurities, the water used for the treatment liquid according to the invention is preferably ion-exchange water, ultrapure water, distilled water, or ultrafiltrated water.

The treatment liquid may additionally contain a colorant. The addition of the colorant improves image density. In addition, use of treatment liquid containing a colorant as the color ink for ink jet printers allows reduction in the number of printing heads required and thus reduction in the production cost and running cost of recording apparatuses.

The surface tension of the treatment liquid according to the invention is preferably in the range of 20 to 50 mN/m, and the viscosity thereof in the range of 1.5 to 3.5 mPa·s. The surface tension thereof and the viscosity thereof are more preferably in the range respectively of 28 to 40 mN/m and of 1.8 to 3.0 mPa·s.

As it is preferable to eject a treatment liquid first and then print an ink when recording using the ink set according to the invention, thereby becomes possible to generate greater coagulative action by making the surface tension of the treatment liquid greater than the surface tension of the ink and thus providing a sufficient contact time.

II. Ink-Jet Recording Method

The ink jet recording method according to the invention is described next.

The ink-jet recording method according to the invention is a method using an ink-jet ink containing a colorant and a surfactant, and a treatment liquid, comprising forming images by bringing the ink-jet ink into contact with the treatment liquid on to a recording medium, wherein an ink droplet formed by bringing the ink-jet ink into contact with the treatment liquid has a ratio (H/R) of height (H) to contact-area diameter (R) of from 0.15 to 0.30, said ratio (H/R) is detected at a point 100 milliseconds (ms) after ejecting the ink droplet onto a plain paper. Namely, images are formed by using the ink set according to the invention.

When ejected onto a recording medium, the ink and the treatment liquid are ejected so that they come into contact with each other. The mode of contact between the two liquids is not particularly limited, and, for example, the two liquids may be ejected as already in mutual contact, or one liquid may be ejected onto a spot where the other liquid is previously spotted.

When ejected onto a recording medium, the two liquids are preferably ejected in the order of first the treatment liquid and then the ink. This is because prior ejection of treatment liquid enables more efficient coagulation of the constituents in the ink. The ink may be ejected at any time after ejection of the treatment liquid, but is preferably ejected at a time of 0.1 second or less after ejection of the treatment liquid.

In the invention, the total ejection amount per unit area of the ink-jet ink and the treatment liquid used is preferably 0.2 to 1.5 mg/cm$^2$ in a printing mode of 400 to 1,200 dpi.

In the invention, the optimal amount of the treatment liquid ejected may vary according to the composition and physical properties of the treatment liquid, which components therein have coagulative action, the kind of colorants contained in the ink, and the kind of recording medium, but is preferably adjusted in the range of about 5 to 30% with respect to the amount of ink-jet ink ejected. The amount of ejection is preferably smaller for prevention of curl and cockle, and thus is more preferably 5 to 15%.

The amount of the ink-jet ink ejected is also preferably adjusted to an amount as small as possible while yet able to preserve coverage and image density. It has been confirmed that use of an ink-jet ink according to the invention provides sufficient coverage even with an ejection amount smaller by 50% than that of conventional inks. In addition, increasing colorant concentration in the ink-jet ink enables preservation of sufficient image density even when ejecting a smaller amount of ink.

A thermal ink-jet recording method or piezo ink-jet recording method is preferable as the ink-jet recording method according to the invention.

Recording media according to the invention include plain papers such as P Paper, Multiace, and C2 Paper (manufactured by Fuji Xerox Office Supply Co., Ltd.), and recycled papers such as Green100, and WR (manufactured by Fuji Xerox Office Supply Co., Ltd.), and the like. Other examples thereof include thick papers such as postcard, and ink-jet papers such as coated papers having a coated layer on the surface thereof and glossy papers.

III. Ink-Jet Recording Apparatus

Hereinafter, the ink-jet recording apparatus according to the invention is described.

The ink-jet recording apparatus according to the invention is an ink-jet recording apparatus using an ink-jet ink set containing an ink-jet ink and a treatment liquid, wherein an ink droplet formed by bringing the ink-jet ink into contact with the treatment liquid has a ratio (H/R) of height (H) to contact-area diameter (R) of from 0.15 to 0.30, the ratio (H/R) is detected at a point 100 milliseconds (ms) after ejecting the ink droplet onto a plain paper.

Hereinafter, suitable embodiment of the ink-jet recording apparatus according to the invention is described with reference to drawings, but it should be understood that the invention is not limited to this embodiment.

Figure 1:
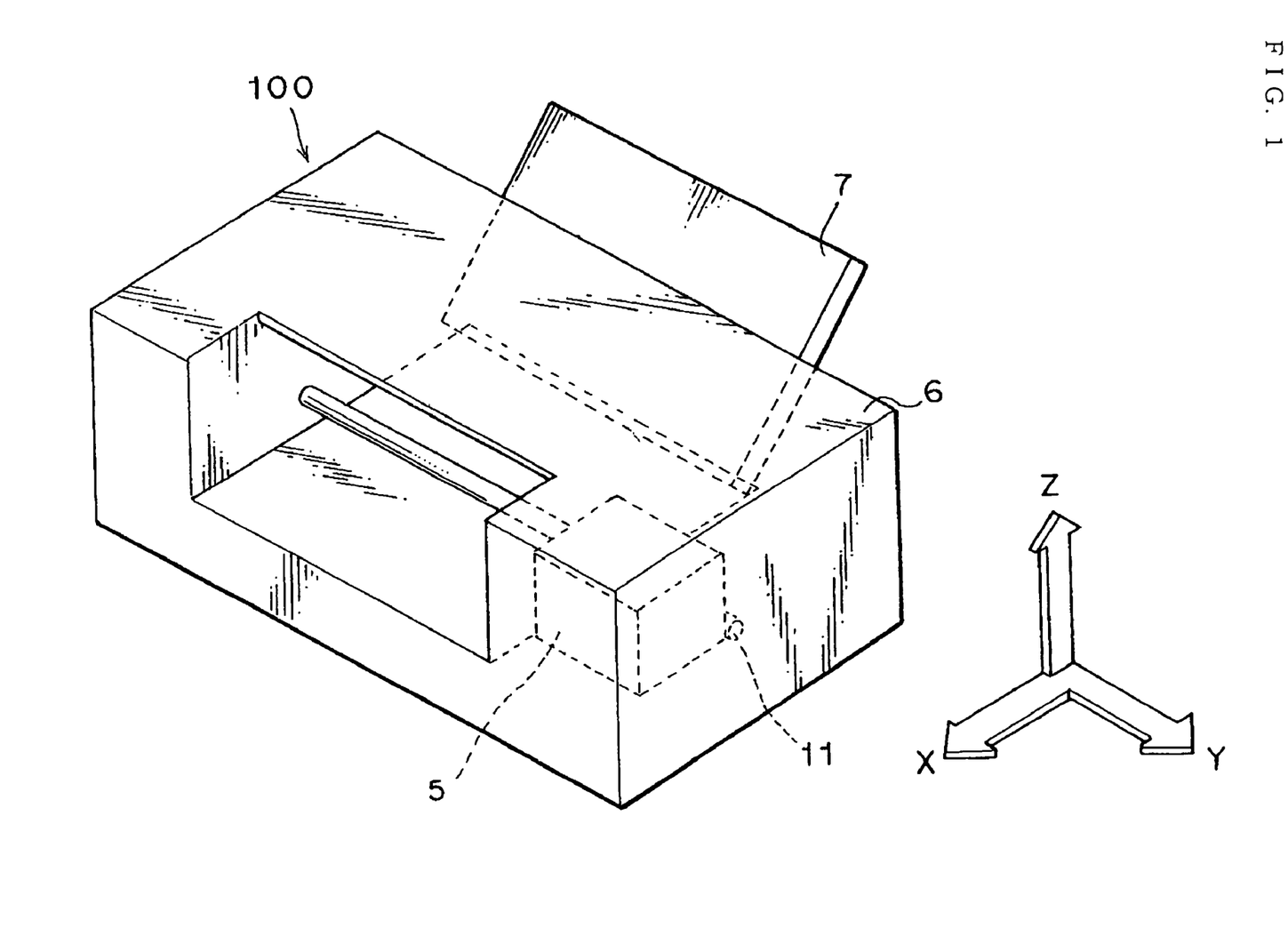
FIG. 1 is a perspective view showing the appearance of an embodiment of an ink-jet image forming apparatus according to the present invention.
Figure 2:
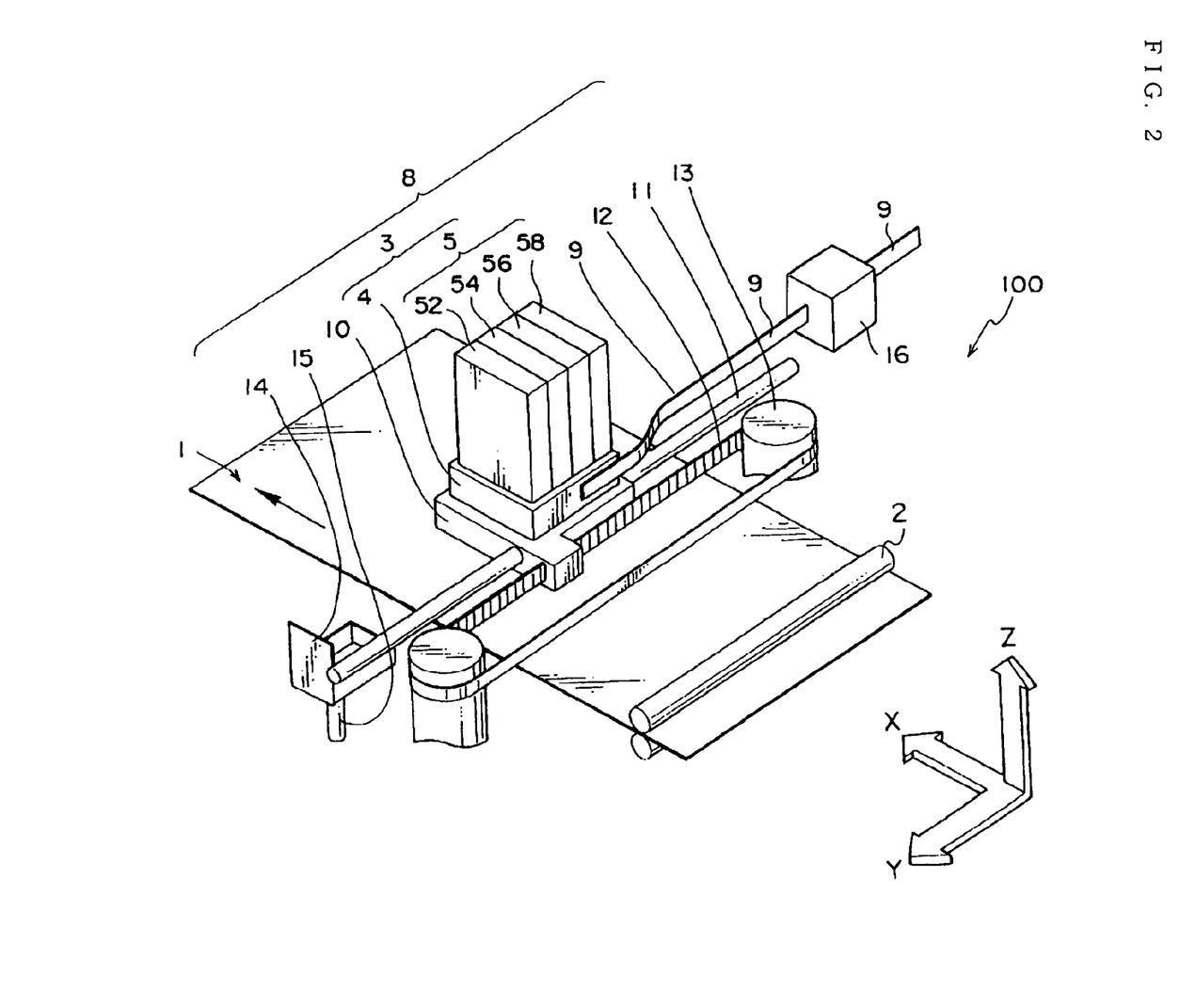
FIG. 2 is a perspective view showing the internal configuration of the ink-jet image forming apparatus in FIG. 1.

FIG. 1 is a perspective view showing the appearance of an embodiment of an recording apparatus according to the invention. FIG. 2 is a perspective view showing the internal configuration of recording apparatus shown in FIG. 1.

A recording apparatus 100 according to the embodiment has a configuration wherein images are formed by the image forming method (ink-jet recording method) according to the invention. As shown in FIGS. 1 and 2, the recording apparatus 100 mainly comprises an external cover 6, a tray 7 able to contain a specified quantity of recording medium 1 such as a plain paper; conveying rollers (conveying means) 2 for conveying the recording medium 1 into the recording apparatus 100 one piece at a time, and an image forming unit 8 (image formation means) that forms an image by ejecting an ink and a liquid composition onto the recording medium 1.

The conveying rollers 2 are a pair of rollers placed in a rotatable manner in the recording apparatus 100, holding between them the recording medium 1 placed on the tray 7 and conveying a particular quantity of the recording medium 1 one peace at a time at a specified interval into the apparatus 100.

The image forming unit 8 forms an image on the recording medium 1 by using an ink. The image forming unit 8 mainly comprises a recording head 3, an ink tank unit 5, a power-supply and signal cable 9, a carriage 10, a guide rod 11, a timing belt 12, driving pulleys 13, and a maintenance unit 14.

In this mode, the ink tank unit 5 has multiple ink tanks 52, 54, 56, and 58 wherein inks and treatment liquids for ejection corresponding to respective different colors are stored.

As shown in FIG. 2, the power-supply and signal cable 9 and the ink tank unit 5 are connected to the recording head 3, and when external image-record information is input via the power-supply and signal cable 9 to the recording head 3, the recording head 3 absorbs a particular amount of an ink from each of the ink tanks which ejects onto the recording medium according to this image-record information. In addition to the image-record information, the power-supply and signal cable 9 also functions to supply to the recording head 3 the power necessary for driving the recording head 3.

Further, the recording head 3 is placed and held on the carriage 10, and the guide rod 11 and the timing belt 12 connected to the driving pulleys 13 are connected to the carriage 10. In such a configuration, the recording head 3 can slide continuously along the guide rod 11, parallel to the surface of the recording medium 1 and in a direction perpendicular to the traveling direction X (sub-scanning direction) of the recording medium 1.

The recording apparatus 100 is also equipped with a means (not shown in the figure) for controlling the drive timing of the recording head 3 and the carriage 10 based on the image-record information. As the result, the apparatus can form images continuously in a particular region on the surface of the recording medium 1 conveyed at a certain speed in the traveling direction X, based on the image-record information.

The maintenance unit 14 is connected via a tube 15 to a pressure-reducing device. Further, the maintenance unit 14 is connected to the nozzle portions of the recording head 3, and absorbs inks from the nozzles in the recording head 3 by evacuating the nozzles in the recording head 3 by using a vacuum pump 16 or the like placed at the connection portion.

Installation of the maintenance unit 14 enables removal as needed of undesired ink attached to the nozzles during operation of the recording apparatus 100, and suppression of evaporation of the ink from the nozzle when operation is suspended. However, as the ink and the treatment liquid generate coagulants when mixed, the maintenance unit 14 is preferably constructed so that ink and treatment liquid thus collected can be stored separately therein.

The recording head is preferably a head using the thermal ink-jet or piezo ink-jet process.

The recording head used is preferably a unit that can eject the ink and treatment liquid onto the recording medium at a total ejection amount per unit area of 0.2 to 1.5 mg/cm$^2$ in a printing mode of 400 to 1200 dpi. An ink-jet recording apparatus that can eject droplets of varying volume from the same nozzle may also be used in the invention.

EXAMPLES

Hereinafter, the present invention is described in detail with reference to Examples, but it should be understood that the invention is not limited to these Examples.

| <Treatment liquid A> | |
|---|---|
| Magnesium nitrate | 1% by mass |
| Glycerin | 10% by mass |
| Diethylene glycol | 10% by mass |
| Surfynol 465 (manufactured by Nisshin Chemicals Co., Ltd.) | 0.5% by mass |
| Water | the balance |

The components above are mixed, to give a treatment liquid A. The surface tension of the treatment liquid A is 35 mN/m, and the viscosity, 1.7 mPa·s. The pH of the treatment liquid A is 7.6.

| <Treatment liquid B> | |
|---|---|
| Acetic acid | 3% by mass |
| Sodium acetate | 3% by mass |
| Glycerin | 10% by mass |
| Diethylene glycol | 10% by mass |
| Surfynol 465 (manufactured by Nisshin Chemicals Co., Ltd.) | 0.5% by mass |
| Water | the balance |

The components above are mixed, to give a treatment liquid B. The surface tension of the treatment liquid B is 33 mN/m, and the viscosity 2.1 mPa·s. The pH of the treatment liquid B is 4.3.

| <Ink 1 (self-dispersible pigment dispersion)> | |
| --- | --- |
| Cab-o-jet 300 (manufactured by Cabot) | 3% by mass |
| Diethylene glycol | 20% by mass |
| Isopropyl alcohol | 5% by mass |
| Surfynol 465 (manufactured by Nisshin Chemicals Co., Ltd.) | 0.2% by mass |
| Polyoxyethylene laurylether (EO number: 4.2) | 0.25% by mass |
| Pure water | the balance |

The components above are mixed and stirred, and the resulting mixture is filtered through a membrane filter having a pore size of 5 μm, to give an ink 1.

The surface tension of the ink 1 is 28 mN/m, and the viscosity 3 mPa·s. The pH of the ink 1 is 8.2.

| <Ink 2 (self-dispersible pigment dispersion)> | |
| --- | --- |
| Carbon black (CW-2, manufactured by Orient Chemical Industries, Ltd.) | 3% by mass |
| Diethylene glycol | 20% by mass |
| Polyoxyethylene laurylether (EO number: 5) | 0.15% by mass |
| Surfynol 465 (manufactured by Nisshin Chemicals Co., Ltd.) | 0.3% by mass |
| Pure water | the balance |

The components above are mixed and stirred, and the resulting mixture is filtered through a membrane filter having a pore size of 5 μm, to give an ink 2.

The surface tension of the ink 2 is 29 mN/m, and the viscosity 2.4 mPa·s. The pH of the ink 2 is 8.1.

| <Ink 3 (self-dispersible pigment dispersion)> | |
| --- | --- |
| Carbon black (CW-2, manufactured by Orient Chemical Industries, Ltd.) | 3% by mass |
| Diethylene glycol | 10% by mass |
| Propylene glycol monomethylether | 10% by mass |
| Sodium dodecylbenzenesulfate (Neopelex G, manufactured by Kao Corporation) | 0.2% by mass |
| Surfynol 465 (manufactured by Nisshin Chemicals Co., Ltd.) | 0.05% by mass |
| Pure water | the balance |

The components above are mixed and stirred, and the resulting mixture is filtered through a membrane filter having a pore size of 5 μm, to give an ink 3.

The surface tension of the ink 3 is 40 mN/m, and the viscosity 2.2 mPa·s. The pH of the ink 3 is 7.7.

| <Ink 4 (self-dispersible pigment dispersion)> | |
| --- | --- |
| Carbon black (CW-2, manufactured by Orient Chemical Industries, Ltd.) | 3% by mass |
| Diethylene glycol | 10% by mass |
| Propylene glycol monomethylether | 10% by mass |
| Sodium butylnaphthalenesulfate (Pelex NB-L, manufactured by Kao Corporation) | 0.4% by mass |

| -continued | |
| --- | --- |
| <Ink 4 (self-dispersible pigment dispersion)> | |
| Surfynol 465 (manufactured by Nisshin Chemicals Co., Ltd.) | 0.2% by mass |
| Pure water | the balance |

The components above are mixed and stirred, and the resulting mixture is filtered through a membrane filter having a pore size of 5 μm, to give an ink 4.

The surface tension of the ink 4 is 29 mN/m, and the viscosity 2.7 mPa·s. The pH of the ink 4 is 7.6.

| <Ink 5 (self-dispersible pigment dispersion)> | |
| --- | --- |
| Cab-o-jet 300 (manufactured by Cabot) | 3% by mass |
| Diethylene glycol | 20% by mass |
| Isopropyl alcohol | 5% by mass |
| Pure water | the balance |

The components above are mixed and stirred, and the resulting mixture is filtered through a membrane filter having a pore size of 5 μm, to give an ink 5.

The surface tension of the ink 5 is 30 mN/m, and the viscosity 3.2 mPa·s. The pH of the ink 5 is 8.

| <Ink 6 (self-dispersible pigment dispersion)> | |
| --- | --- |
| Cab-o-jet 300 (manufactured by Cabot) | 3% by mass |
| Diethylene glycol | 15% by mass |
| Isopropyl alcohol | 15% by mass |
| Polyoxyethylene laurylether (EO number: 4.2) | 0.5% by mass |
| Pure water | the balance |

The components above are mixed and stirred, and the resulting mixture is filtered through a membrane filter having a pore size of 5 μm, to give an ink 6.

The surface tension of the ink 6 is 28 mN/m, and the viscosity 2.7 mPa·s. The pH of the ink 6 is 8.1.

| <Ink 7 (self-dispersible pigment dispersion)> | |
| --- | --- |
| Cab-o-jet 300 (manufactured by Cabot) | 3% by mass |
| Diethylene glycol | 15% by mass |
| Isopropyl alcohol | 5% by mass |
| Sodium butylnaphthalenesulfate (Pelex NB-L, manufactured by Kao Corporation) | 1.5% by mass |
| Pure water | the balance |

The components above are mixed and stirred, and the resulting mixture is filtered through a membrane filter having a pore size of 5 μm, to give an ink 7.

The surface tension of the ink 7 is 30 mN/m, and the viscosity 2.2 mPa·s. The pH of the ink 7 is 8.1.

Examples 1 to 9 and Comparative Examples 1 to 7

Ink sets used in Examples and Comparative Examples are prepared in the combinations shown in Table 1 of the treatment liquids and inks obtained above, and the physical properties and printing quality thereof are evaluated in the following.

<<Evaluation of the Physical Properties of Ink>>

<H/R Ratio>

The diameter of the contact area (R) between an ink droplet and a recording medium and the height (H) of the ink droplet on the recording medium at a point of 100 milliseconds (ms) after ejection of the ink droplet are determined by using a dynamic contact angle measuring device FIBRO 1100 DAT MKII (manufactured by FIBRO System AB), and the H/R ratio is calculated.

<Surface Tension>

The surface tension of an ink composition thus obtained is determined under an environment of 23° C. and 55% RH by using a Wilhelmy surface tension balance (manufactured by Kyowa Interface Science). The recording medium used is P Paper, manufactured by Fuji Xerox Office Supply Co., Ltd.

<Viscosity>

The viscosities of the ink and the treatment liquid thus obtained are determined by using the Rheomat 115 (manufactured by Contraves) as a measuring device. The viscosity is determined by placing an ink composition in the measuring container, installing the container according to predetermined method in the measuring device, and measuring under a condition of a temperature of 23° C. and a shear rate of 1,400 $s^{-1}$.

<Evaluation of Printed Image>

Printing quality is evaluated by using an ink jet printer, WorkCentre B900N manufactured by Fuji Xerox Co., Ltd. The recording medium used is P Paper manufactured by Fuji Xerox Office Supply Co., Ltd., and an ink-jet ink is ejected on the area where a reactive treatment liquid is previously ejected.

The amount of the treatment liquid ejected is 10% of the amount of the ink-jet ink ejected.

<Image Density>

It is evaluated whether it is possible to obtain sufficient image density even if the amount of ink ejected is reduced.

The density of a closely overlapping image having 100% coverage is designated as A, and the density of a closely overlapping image having 75% coverage printed on the area the treatment liquid is previously ejected is designated as B.

The image density is determined by using an optical density analyzer, X-Rite MODEL 404 (manufactured by X-Rite, Incorporated.).

—valuation Criteria—

Ecellent: (Image density B)−(Image density A)≧0.05
Better: 0≦(Image density B)−(Image density A)<0.05
Good: −0.05≦(Image density B)−(Image density A)<0
Poor: (Image density B)−(Image density A)<−0.05

<Drying Property>

The drying speed of an image after printing is determined. A coated paper (high-grade GCAA0002, manufactured by Fuji Xerox Co., Ltd.) is placed over a printed image and pressed with a load of 100 g/$cm^2$, and the time when the printed ink is no more transferred to the covering paper is determined.

—Evaluation Criteria—

Ecellent: The time is less than 1 second after printing.
Better: The time is more than 1 second or more and less than 2 seconds after printing.
Good: The time is more than 2 seconds or more and less than 5 seconds after printing.
Poor: The time is more than 5 seconds or more after printing.

<Curl>

Curl at both edges of a paper that is discharged from a printer after image printing is determined. Heights of the curls at the edges of the paper are determined when the paper is placed on a horizontal face.

—Evaluation Criteria—

Excellent: The height is less than 2 mm.
Good: The height is 2 mm or more and less than 5 mm.
Poor: The height is 5 mm or more.

<Cockle>

Presence or absence of cockles and irregularity on a paper discharged from a printer after image printing are determined by visual observation.

—Evaluation Criteria—

Excellent: No cockles or irregularity.
Good: Some cockles and irregularity observed, but the height of the cockles is less than 1 mm.
Poor: Significant cockles and irregularity, and the height of the cockles is 1 mm or more.

<White Spots>

Presence or absence of white spots remaining in a closely overlapping image is observed by using a 25-times magnifying glass.

—Evaluation Criteria—

Excellnt: The image is painted completely without any white spots.
Good: Although there are some white spots observable, there are no printed dots observable.
Poor: There are many printed dots incompletely overlapped and some independent dots observable.

TABLE 1

|  | Ink set | H/R | Surface tension (mN/m) | Viscosity (mPa s) | pH | pH Difference | Image density | Drying property | Curl | Cockle | Whitening |
| --- | --- | --- | --- | --- | --- | --- | --- | --- | --- | --- | --- |
| Example 1 | Ink 1 | 0.18 | 28 | 3 | 8.2 | 0.6 | EXCELLNT | EXCELLNT | EXCELLNT | EXCELLNT | EXCELLNT |
|  | Treatment liquid A |  | 35 | 1.7 | 7.6 |  |  |  |  |  |  |
| Example 2 | Ink 2 | 0.25 | 29 | 2.4 | 8.1 | 0.4 | BETTER | EXCELLNT | EXCELLNT | EXCELLNT | EXCELLNT |
|  | Treatment liquid A |  | 35 | 1.7 | 7.6 |  |  |  |  |  |  |
| Example 3 | Ink 3 | 0.29 | 40 | 2.2 | 7.7 | 0.1 | EXCELLNT | BETTER | EXCELLNT | EXCELLNT | EXCELLNT |
|  | Treatment liquid A |  | 35 | 1.7 | 7.6 |  |  |  |  |  |  |

TABLE 1-continued

|  | Ink set | H/R | Surface tension (mN/m) | Viscosity (mPa s) | pH | pH Difference | Image density | Drying property | Curl | Cockle | Whitening |
|---|---|---|---|---|---|---|---|---|---|---|---|
| Example 4 | Ink 4 | 0.28 | 29 | 2.7 | 7.6 | 0 | EXCELLNT | EXCELLNT | EXCELLNT | EXCELLNT | EXCELLNT |
|  | Treatment liquid A |  | 35 | 1.7 | 7.6 |  |  |  |  |  |  |
| Example 5 | Ink 1 | 0.18 | 28 | 3 | 8.2 | 3.9 | EXCELLNT | EXCELLNT | EXCELLNT | EXCELLNT | EXCELLNT |
|  | Treatment liquid B |  | 33 | 2.1 | 4.3 |  |  |  |  |  |  |
| Example 6 | Ink 2 | 0.25 | 29 | 2.4 | 8.1 | 3.8 | BETTER | EXCELLNT | EXCELLNT | EXCELLNT | EXCELLNT |
|  | Treatment liquid B |  | 33 | 2.1 | 4.3 |  |  |  |  |  |  |
| Example 7 | Ink 3 | 0.29 | 40 | 2.2 | 7.7 | 3.4 | EXCELLNT | BETTER | EXCELLNT | EXCELLNT | EXCELLNT |
|  | Treatment liquid B |  | 33 | 2.1 | 4.3 |  |  |  |  |  |  |
| Example 8 | Ink 4 | 0.28 | 29 | 2.7 | 7.6 | 3.3 | EXCELLNT | EXCELLNT | EXCELLNT | EXCELLNT | EXCELLNT |
|  | Treatment liquid B |  | 33 | 2.1 | 4.3 |  |  |  |  |  |  |
| Example 9 | Ink 7 | 0.22 | 30 | 2.2 | 7.7 | 3.4 | BETTER | EXCELLNT | EXCELLNT | EXCELLNT | EXCELLNT |
|  | Treatment liquid B |  | 33 | 2.1 | 4.3 |  |  |  |  |  |  |
| Comparative Example 1 | Ink 1 | 0.18 | 28 | 3 | 8.2 | — | POOR | GOOD | POOR | POOR | EXCELLNT |
|  | No treatment liquid |  | — | — | — |  |  |  |  |  |  |
| Comparative Example 2 | Ink 2 | 0.25 | 29 | 2.4 | 8.1 | — | POOR | POOR | GOOD | GOOD | EXCELLNT |
|  | No treatment liquid |  | — | — | — |  |  |  |  |  |  |
| Comparative Example 3 | Ink 3 | 0.29 | 40 | 2.2 | 7.7 | — | GOOD | POOR | GOOD | GOOD | POOR |
|  | No treatment liquid |  | — | — | — |  |  |  |  |  |  |
| Comparative Example 4 | Ink 5 | 0.35 | 30 | 3.2 | 8 | 0.4 | GOOD | POOR | GOOD | GOOD | POOR |
|  | Treatment liquid A |  | 35 | 1.7 | 7.6 |  |  |  |  |  |  |
| Comparative Example 5 | Ink 6 | 0.13 | 28 | 2.7 | 8.1 | 0.5 | POOR | GOOD | POOR | POOR | GOOD |
|  | Treatment liquid A |  | 35 | 1.7 | 7.6 |  |  |  |  |  |  |
| Comparative Example 6 | Ink 5 | 0.35 | 30 | 3.2 | 8 | 3.7 | GOOD | POOR | GOOD | GOOD | POOR |
|  | Treatment liquid B |  | 33 | 2.1 | 4.3 |  |  |  |  |  |  |
| Comparative Example 7 | Ink 6 | 0.13 | 28 | 2.7 | 8.1 | 3.8 | POOR | GOOD | POOR | POOR | GOOD |
|  | Treatment liquid B |  | 33 | 2.1 | 4.3 |  |  |  |  |  |  |

As apparent from Table 1, the ink-jet ink sets according to the invention in Examples 1 to 9 provide images higher in density even with a smaller amount of ink ejected, and superior in drying property, without causing any incidence of curl and cockle of printed paper.

What is claimed is:

1. An ink-jet ink set comprising: an ink-jet ink containing a colorant and a surfactant; and a treatment liquid, wherein an ink droplet formed by bringing the ink-jet ink into contact with the treatment liquid has a ratio (H/R) of height (H) to contact-area diameter (R) of from 0.15 to 0.30, said ratio (H/R) is detected, when the ink is in liquid form, at a point 100 milliseconds (ms) after ejecting the ink droplet onto a plain paper.

2. An ink-jet ink set according to claim 1, wherein the surfactant comprises a branched-chain surfactant and a straight-chain surfactant.

3. An ink-jet ink set according to claim 2, wherein the straight chain surfactant is an anionic surfactant.

4. An ink-jet ink set according to claim 3, wherein the anionic straight-chain surfactant is an alkylaromatic surfactant having an alkyl group having 3 to 6 carbon atoms.

5. An ink-jet ink set according to claim 4, wherein the alkylaromatic surfactant having an alkyl group having 3 to 6 carbon atoms is an alkylbenzenesulfate or an alkylnaphthalenesulfate.

6. An ink-jet ink set according to claim 2, wherein the straight-chain surfactant is a nonionic surfactant.

7. An ink-jet ink set according to claim 6, wherein the nonionic straight-chain surfactant is a polyoxyethylene straight-chain alkylether or a polyoxyethylene straight-chain alkylphenyl ether.

8. An ink-jet ink set according to claim 2, wherein the branched-chain surfactant is a nonionic branched-chain surfactant.

9. An ink-jet ink set according to claim 8, wherein the nonionic branched-chain surfactant is an acetylene glycol derivative or a polyoxyethylene branched-alkylether.

10. An ink-jet ink set according to claim 2, wherein the straight-chain surfactant is an alkylaromatic surfactant having an alkyl group having 3 to 6 carbon atoms, and the branched-chain surfactant is a nonionic branched-chain surfactant.

11. An ink-jet ink set according to claim 2, wherein the straight-chain surfactant is selected from polyoxyethylene straight-chain alkylethers, polyoxyethylene straight-chain alkylphenylethers, N-straight-chain alkyl-substituted pyridinium salts, alkylaromatic surfactants, and the branched-chain surfactant is selected from acetylene glycol derivatives, polyoxyethylene branched-alkylethers, dialkylsulfosuccinates, quaternary ammonium salts, N-branched alkyl-substituted pyridinium salts, betaine surfactants.

12. An ink-jet ink set according to claim 2, wherein the straight-chain surfactant is selected from an alkylbenzenesulfate and an alkylnaphthalenesulfate, each having an alkyl chain of 3 to 6 carbon, and the branched-chain surfactant is selected from acetylene glycol derivatives and polyoxyethylene branched-alkylethers.

13. An ink-jet ink set according to claim 2, wherein the ink-jet ink has the straight-chain surfactant in an amount of from 0.05 to 2.5% by mass to a total solids content of the ink-jet ink, and the ink-jet ink has the branched-chain surfactant in an amount of from 0.01 to 2.0% by mass to a total solids content of the ink-jet ink.

14. An ink-jet ink set according to claim 2, wherein the ink-jet ink has the straight-chain surfactant in an amount of from 0.1 to 1.5% by mass to a total solids content of the ink-jet ink, and the ink-jet ink has the branched-chain surfactant in an amount of from 0.01 to 1.0% by mass to a total solids content of the ink-jet ink.

15. An ink-jet ink set according to claim 2, wherein the ink-jet ink has a content ratio of the straight-chain surfactant to the branched-chain surfactant of from 1.2:1 to 20:1.

16. An ink-jet ink set according to claim 2, wherein the ink-jet ink has a content ratio of the straight-chain surfactant to the branched-chain surfactant of from 1.5:1 to 7:1.

17. An ink-jet ink set according to claim 1, wherein the ink-jet ink has a surface tension of from 18 to 30 mN/m, and has a viscosity of from 1.8 to 4.5 mPa·s.

18. An ink-jet ink set according to claim 1, wherein the treatment liquid has the surface tension of from 20 to 50 mN/m, and has the viscosity of from 1.5 to 3.5 mPa·s.

19. An ink-jet ink set according to claim 1, wherein the ink-jet ink and the treatment liquid have an absolute value of the difference in pH of 3.0 or more.

20. An ink-jet recording method using an ink-jet ink containing a colorant and a surfactant, and a treatment liquid, comprising forming images by bringing the ink-jet ink into contact with the treatment liquid on to a recording medium, wherein an ink droplet formed by bringing the ink-jet ink into contact with the treatment liquid has a ratio (H/R) of height (H) to contact-area diameter (R) of from 0.15 to 0.30, said ratio (H/R) is detected, when the ink is in liquid form, at a point 100 milliseconds (ms) after ejecting the ink droplet onto a plain paper.

21. An ink-jet recording method according to claim 20, wherein the surfactant comprises an alkylaromatic surfactant having an alkyl group having 3 to 6 carbon atoms and a nonionic branched surfactant.

22. An ink-jet recording method according to claim 20, wherein the ink-jet ink and the treatment liquid have a total ejected amount per unit area of from 0.2 to 1.5 mg/cm$^2$ in a printing mode of 400 to 1200 dpi.

23. An ink-jet recording method according to claim 20, wherein the ink-jet ink and the treatment liquid have a total ejected amount per unit area of from 0.3 to 1.0 mg/cm$^2$ in a printing mode of 400 to 1200 dpi.

24. An ink-jet recording method according to claim 20, wherein the treatment liquid has an ejected amount of from 5% to 30% of the ejected amount of the ink-jet ink.

25. An ink-jet recording method according to claim 20, wherein the treatment liquid has the ejected amount of from 5% to 15% of the ejected amount of the ink-jet ink.

26. An ink-jet recording apparatus using an ink-jet ink set containing an ink-jet ink and a treatment liquid, wherein an ink droplet formed by bringing the ink-jet ink into contact with the treatment liquid has a ratio (H/R) of height (H) to contact-area diameter (R) of from 0.15 to 0.30, said ratio (H/R) is detected, when the ink is in liquid form, at a point 100 milliseconds (ms) after ejecting the ink droplet onto a plain paper.

* * * * *